Figure 9:
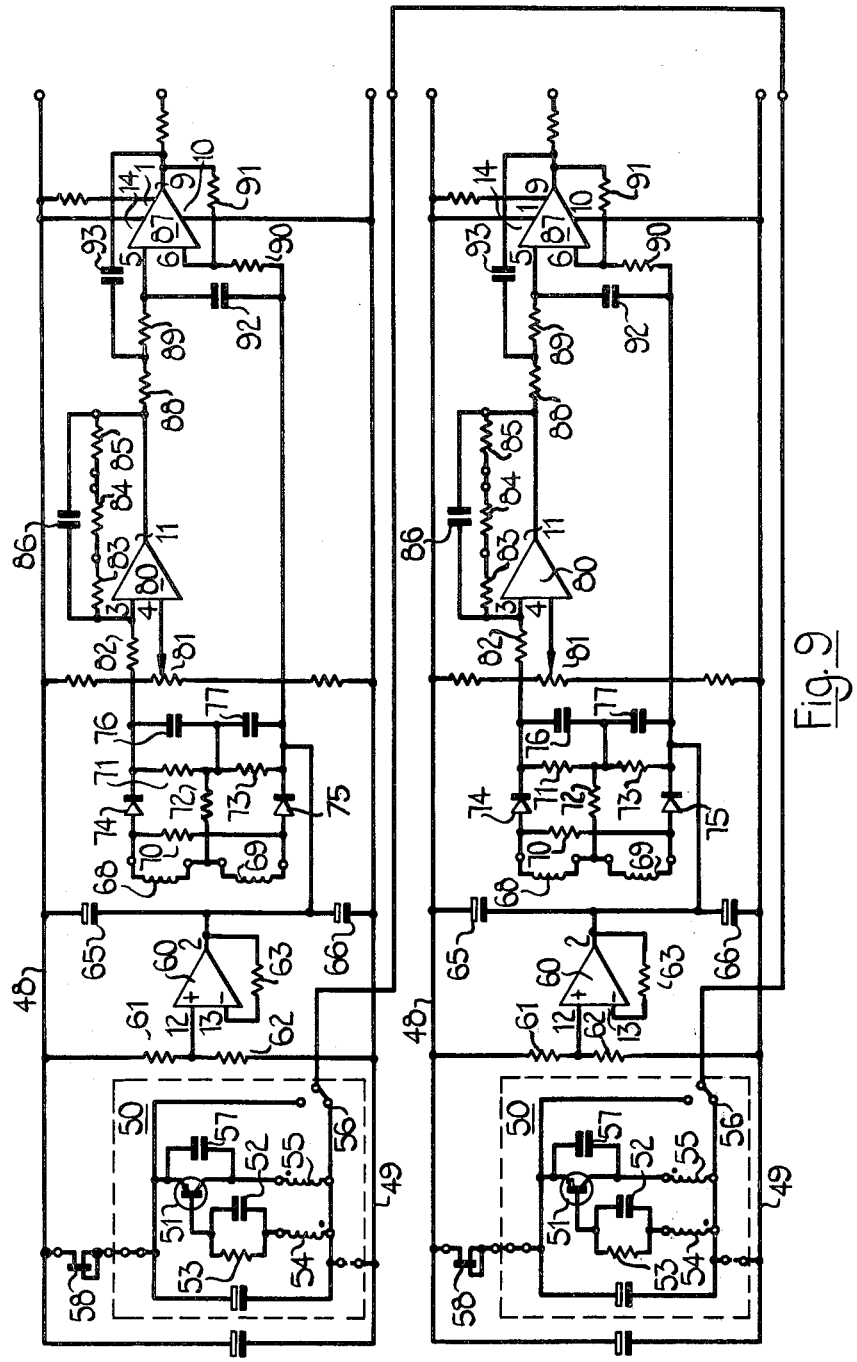

United States Patent [19]

Lewis

[11] 4,218,671
[45] Aug. 19, 1980

[54] MINE CAGE POSITION DESCRIBER

[75] Inventor: David C. Lewis, Burton-on-Trent, England

[73] Assignee: Coal Industry (Patents) Limited, London, England

[21] Appl. No.: 946,241

[22] Filed: Sep. 27, 1978

[30] Foreign Application Priority Data

Oct. 10, 1977 [GB] United Kingdom ............... 42013/77

[51] Int. Cl.² .............................................. B66B 3/02
[52] U.S. Cl. ........................................ 340/21; 340/23
[58] Field of Search ................... 340/23, 24, 19 R, 21,
340/195, 177 R, 196; 246/167 M, 167 R, 63 R,
63 C; 187/29 R; 364/424, 460, 433, 449;
324/207, 208, 220, 221, 226

[56] References Cited

U.S. PATENT DOCUMENTS

| 3,048,818 | 8/1962 | Burckhardt et al. | 340/21 |
| 3,199,630 | 8/1965 | Engel et al. | 340/21 |
| 3,654,549 | 4/1972 | Maurer et al. | 340/195 |
| 3,786,411 | 1/1974 | Kurauchi et al. | 340/23 |
| 3,967,064 | 6/1976 | Sigworth | 340/195 |

Primary Examiner—John W. Caldwell, Sr.
Assistant Examiner—James J. Groody
Attorney, Agent, or Firm—James C. Wray

[57] ABSTRACT

A mine cage position describer used for monitoring movement of a member along an elongate path which includes a magnetizable component extensible along the elongate path. The component is magnetized inducing an electrical field to be generated which defines a wave-like pattern of constant pitch. The equipment includes a magnetic detector component comprising two magnetic sensors arrangeable adjacent to the magnetizable component and spared from one another. The two magnetic sensors derive a first electrical signal and a second electrical signal in response to the magnetic field. The electrical signals vary with the wave-like pattern of the magnetic field and are out of phase by an amount dependent on the spacing of the sensors. Error detection means detect circuit faults which could produce misleading positional data.

13 Claims, 17 Drawing Figures

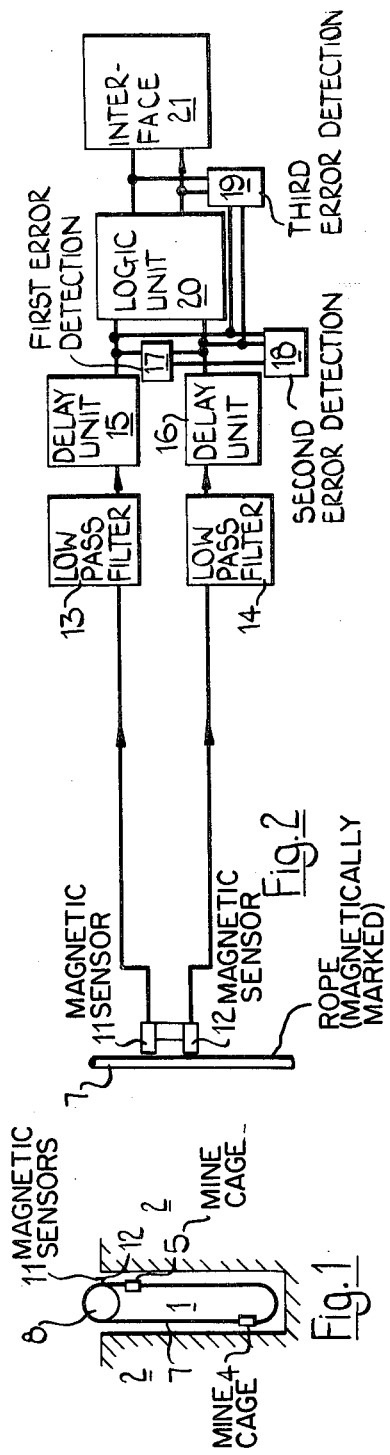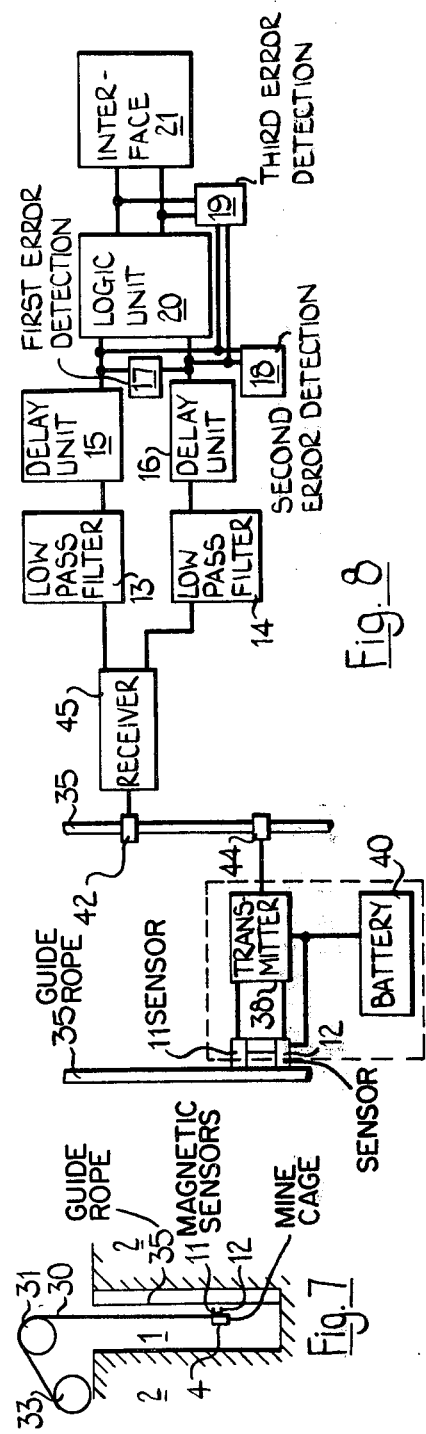

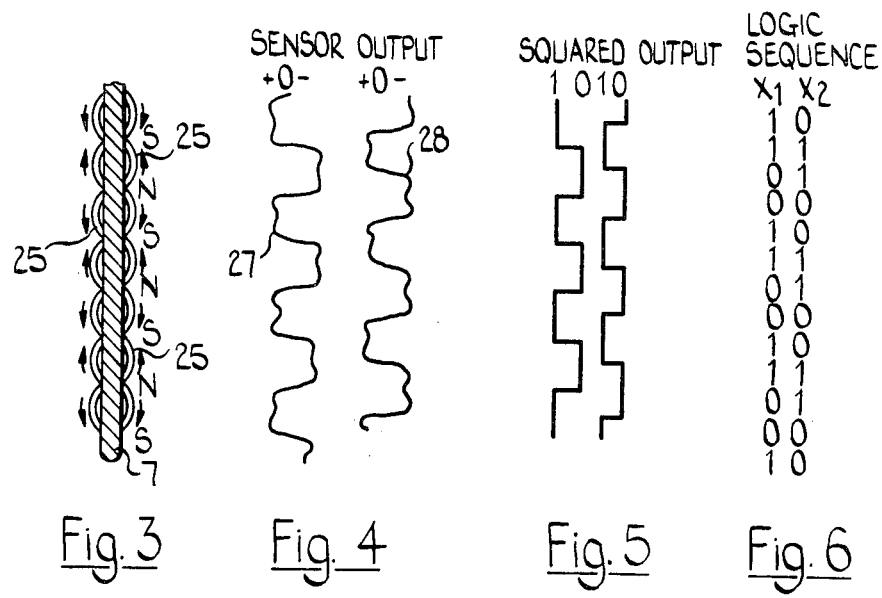

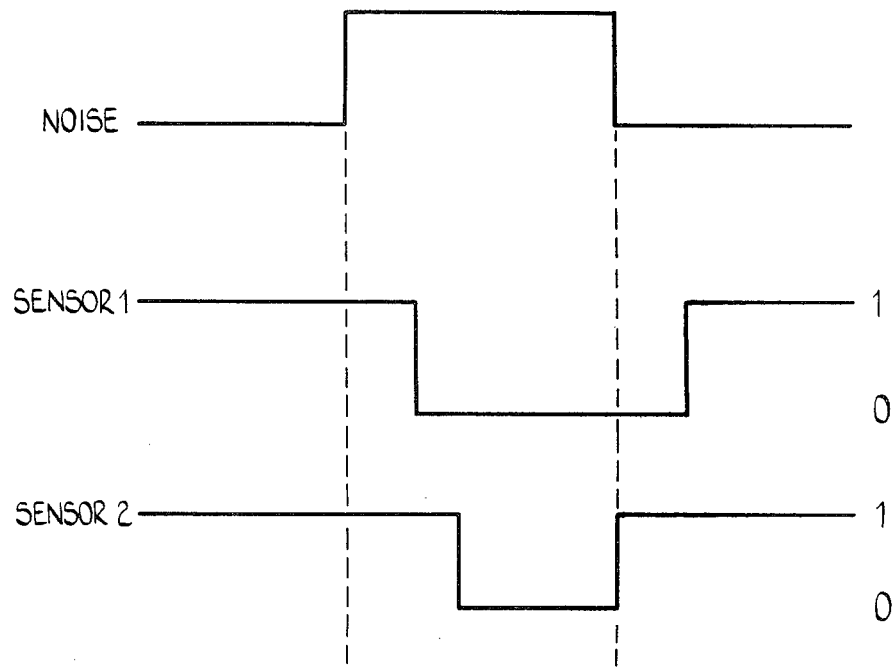

MINE CAGE POSITION DESCRIBER

This invention relates to equipment for monitoring movement of a member along an elongate path along which a magnetizable component is extensible. The invention finds particular, but not exclusive, application in association with a mine winder installation.

In such an installation, one or more mine cages are wound up and down a mine shaft upon a metallic rope. It is desirable that an operator should know positions of the mine cages in the mine shaft.

An object of the present invention is to provide equipment which tends to afford accurate data concerning position of the mine cage in the mine shaft. A further object of the invention is to provide equipment which affords data concerning velocity of the mine cages, which data tends to be incorruptible by interference or circuit failure.

Accordingly the present invention provides equipment for monitoring movement of a member along an elongate path along which a magnetizable component is extensible, the magnetizable component being magnetized such that a magnetic field in induced adjacent thereto, the induced magnetic field intensity varying longitudinally of the magnetizable component and along said elongate path insofar as the magnetizable component is extended therealong said induced magnetic field defining a wave like pattern of constant pitch, the equipment including a magnetic detector component comprising two magnetic sensors arrangeable adjacent to the magnetizable component and spaced from one another by an amount differing from said pitch or from one quarter or said pitch or from multiples of one quarter of said pitch, one of the components being movable with respect to the other component as the member moves, the two magnetic sensors deriving a first electrical signal and a second electrical signal respective electrical signals in response to the magnetic field sensed adjacent to the magnetizable component, said electrical signals varying as said wave like pattern and being out of phase by an amount dependent upon said amount of spacing of the sensors, error detecting means for differentiating error components from information components in the derived electrical signals and sequential analysis means for deriving a further signal indicative of the magnitude and direction of movement of the member from the derived electrical signals.

Preferably, the error detecting means comprises a first time delay unit connected between the first sensor and the sequential analysis means and a second time delay unit connected between the second sensor and the sequential analysis means, the first time delay unit and the second time delay unit having differing time constants so that error components common to the first electrical signal and the second electrical signal have a differing effect on the two signals to detect the common error component.

Preferably, the first and second time delay units include RC networks.

Advantageously, the error detecting means comprises a first shift register connected between the first sensor and the sequential analysis means to count up in response to the first electrical signal and a second shift register connected between the second sensor and the sequential analysis means to count up in response to the second electrical signal, the first shift register being grounded by the second electrical signal and the second shift register being grounded by the first electrical signal, the shift registers having a warning output when full.

Preferably, the error detecting means comprises a first gate having inputs connected to receive the first signal and the second signal, a second gate having inputs connected to a point along the first shift register and to a point along the second shift register a circuit arranged to derive a third electrical signal of a desired value and a third gate arranged to receive the output signals from the first gate, second gate and circuit and to derive a warning output if the first signal and the second signal should occur out of a derived sequence at a rate determined by the value of the third electrical signal.

Advantageously, the error detecting means comprises a fourth gate connected to the inputs to the sequential analysis means and having an output dependent upon the inputs, a fifth gate connected to the outputs and a sixth gate connected to the outputs of the fourth gate and the fifth gate, the sixth gate having a warning output if the outputs from the fourth and fifth gate vary other than in a desired manner.

Preferably, the error detecting means comprises a seventh gate and an eighth gate connected to the outputs of the fourth gate and fifth gate respectively and arranged as a flip-flop means in relation to said fourth and fifth gates, a further gate arrangement being connected to the output of the flip-flop means, said flip-flop means being arranged to cause a warning output from the further gate arrangement of the fourth and fifth gates have outputs which vary other than in the desired manner.

Advantageously, a first low pass filter is connected between the first sensor and the first delay unit and a second low pass filter is connected between the second sensor and the second delay unit, the first and second low pass filters removing high frequency noise from the first and second electrical signals respectively.

Conveniently, the first and second sensors comprise flux gate magnetometers.

Preferably, the sequential analysis means comprises a plurality of logic gates and a monostable circuit.

Advantageously, the output from the sequential analysis means is connected to an interface means.

Preferably, the interface means can display the value of said output from the sequential analysis means.

Conveniently, the sequential analysis means includes an optoisolator connected to the logic gates such as to have an output of frequency dependent up the rate at which the sensors move with respect to the elongate member.

Figure 10:
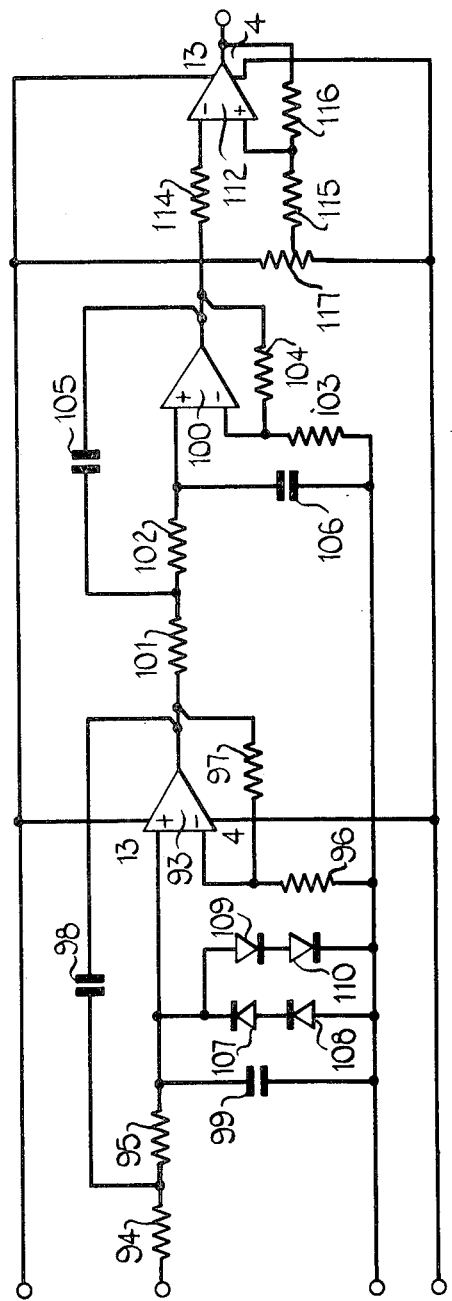
Figure 11:
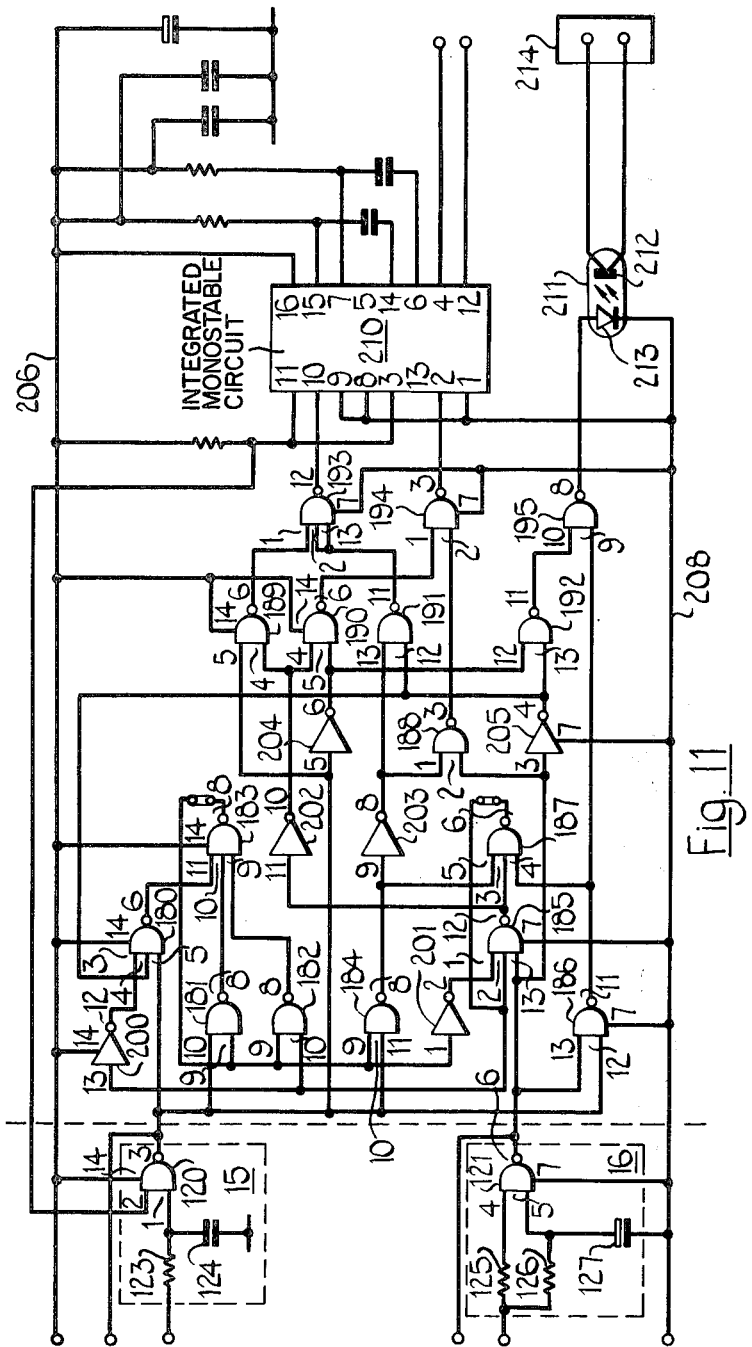
Figure 14:
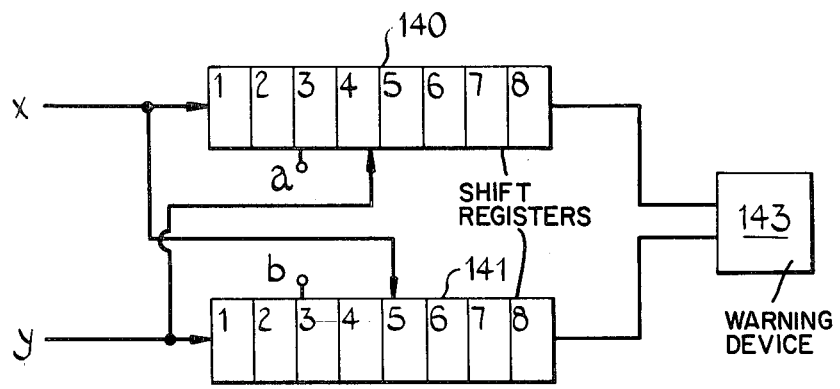
Figure 15:
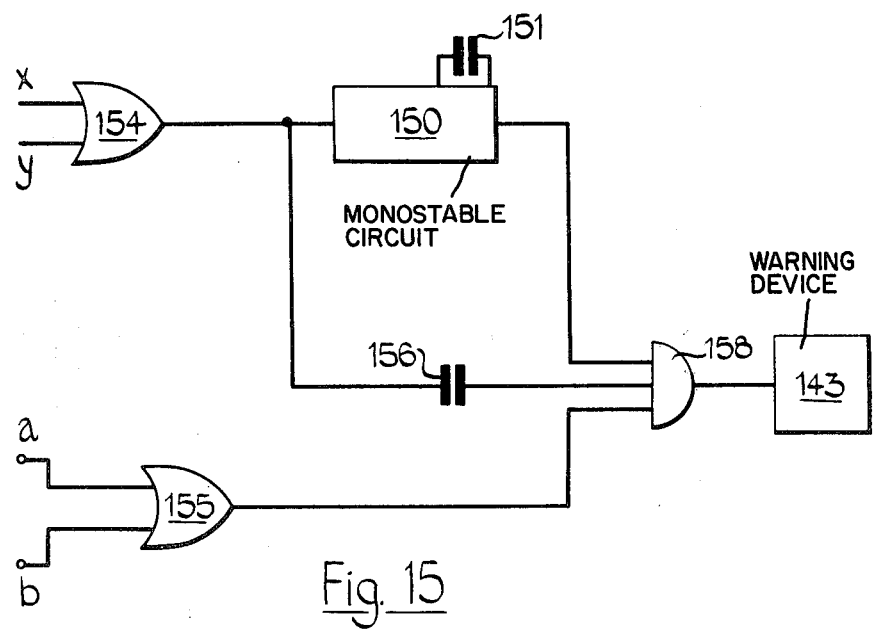
Figure 16:
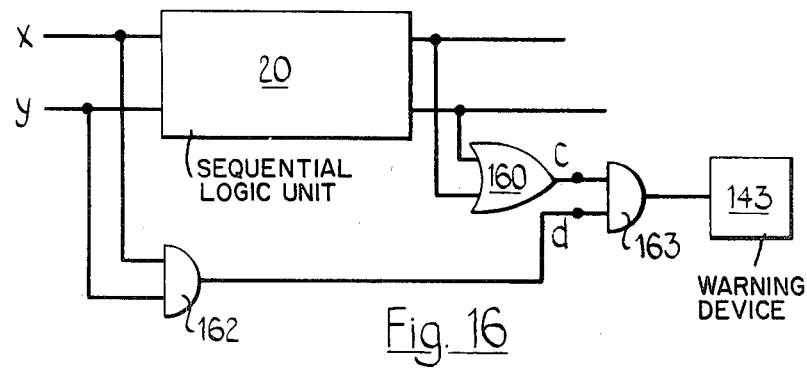
Figure 17:
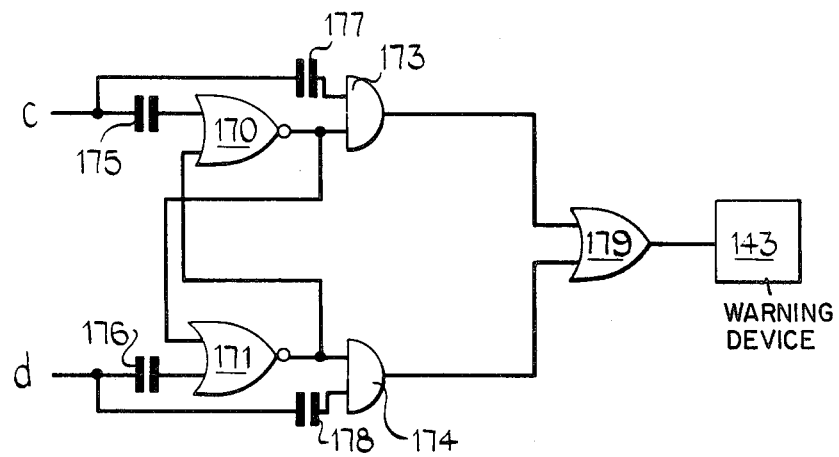

An embodiment of the present invention is now described by way of example only, with reference to the accompanying drawings in which:

FIG. 1 is a diagrammatic view of a first mining installation,

FIG. 2 is a block electrical circuit diagram of the present invention utilized in the installation of FIG. 1, FIG. 3 is a view of part of FIG. 1 and shows a winding rope and magnetic field introduced thereby, FIG. 4 is a diagrammatic representation of an electrical output signal occurring in FIG. 1 or 2, FIG. 5 shows the signal of FIG. 4 after being processed by the electrical circuit of FIG. 2, FIG. 6 shows a representation of FIG. 5 in logic terms, FIG. 7 is a view similar to FIG. 1, but of a different type of mine winding installation, FIG. 8 is a view similar to FIG. 2, but of the installation of FIG. 7, FIG. 9 is a more detailed view of part of FIG. 1, FIG. 2, FIG. 7 or FIG. 8, FIG. 10 is a view similar to FIG. 9, but of a different part, FIG. 11 is a view similar to FIG. 10 but of a further part, FIG. 12 shows a noise pulse arriving in the circuitry of FIG. 11, and its processing in the circuitry, FIG. 13 shows processing of the noise pulse of FIG. 12 in logic terms, FIG. 14 shows a first type of error detection circuit, FIG. 15 shows a second type of error detection circuit, FIG. 16 shows a third type of error detection circuit, and FIG. 17 shows an alternative form of the circuit of FIG. 16.

Referring firstly to FIG. 1, a mine shaft is generally indicated by 1. The shaft 1 provides access to underground mineral workings (not shown). The mine shaft is sunk into the ground which is shown at 2. Two mine cages 4 and 5, respectively, are shown in the shaft 1 and the cages are supported on a steel rope 7. The steel rope 7 is frictionally wound in around a drum 8. The rope 7 is magnetically striped as is described below with reference to FIG. 3. A pair of magnetic sensors 11 and 12, respectively, is mounted near the top of the shaft and the sensors are arranged adjacent to the marked steel rope 7.

Turning now to FIG. 2, the magnetically marked rope and the pair of sensors are again indicated by 7, 11 and 12 respectively. The sensors 11, 12 each derive an electrical signal in response to a magnetic field sensed adjacent to the rope (as will be described below with reference to FIG. 3) and the electrical signals are fed along separate channels to low pass filters 13 and 14, respectively. The electrical signals are then fed to a sequential logic unit 20, via two delay units 15 and 16 connected to low pass filter 13 and 14, respectively, each delay unit having a different time constant. A first error detection circuit 17 is connected across the two sensor signal channels and is provided for comparing the two sensor signals to derive an alarm signal if one of the channels should operate faultily. A second error detection circuit 18 is connected across the two signal channels at their input to the logic unit 20 to compare the signals with signals produced in the first error detection circuit 17. A third error detection circuit 19 compares the inputs and outputs of the circuit to derive an alarm signal if the unit 20 functions faultily. The sequential logic unit 20 derives a further electrical signal from the received electrical signals which further signal is fed to interface means 21 for display or into a computer.

Referring now to FIG. 3, part of the rope 7 of FIG. 1 is shown in greater detail. The rope 7 is magnetically striped with magnetic NORTH and SOUTH poles indicated by N and S respectively. Magnetic field lines are variously shown by 25 and the directions thereof by arrows adjacent thereto. The rope is magnetically striped by any suitable means such as by placing a permanent of electro magnet in the vicinity of the rope. A pitch is taken to be the distance from North through South to the next North. The magnetic poles are normally uniformly placed throughout the rope length. The pitch, however, can be varied so that the system is made compatible with friction winding equipment or other reference points such as in the shaft.

Turning to FIG. 4, two curves 27 and 28 are shown representing electrical signals derived by the sensors 11 and 12, respectively, in response the magnetic field induced by the rope 7. The sensors derive the electrical signals in response to the component of the induced magnetic field parallel to the longitudinal axis of the rope 7.

Referring to FIG. 5, the signals from the sensors 11 and 12 are shown after being processed into square waves. For the purposes of logical analysis, the signal values can be taken to be logic 1 to the left and logic 0 to the right as is indicated by the 10, 10 symbols drawn above the square waves.

FIG. 6 shows the logical signal value at various positions down the steel rope 7 corresponding to the values of the curves 27 and 28 in FIG. 4 and the square wave signals of FIG. 5. In FIG. 6 the channel from sensor 11 is indicated at $x_1$ and that from sensor 12 at $x_2$. From the FIGS. 5 and 6, it can be seen that a new pair of values is created every time one of the square waves switches from 0 to 1 or from 1 to 0. The pairs of values follow a periodic cycle which varies as the magnetic markings on the rope 7.

Turning now to FIG. 7, a second type of mine winding installation is depicted and like reference numerals are used as in FIG. 1 where this is appropriate. In this installation a single mine cage 4 is supported on an unmagnetized rope 30. The rope 30 is drivably engaged by a drum 31 to haul the mine cage up and down and spare rope is stored on a further drum 33. In this installation, the sensors 11 and 12 are mounted on the mine cage 4 and are positioned so as to sense a guide rope 35 arranged down the shaft 1. The guide rope 35 is magnetically marked in a like manner to the winding rope 7 previously mentioned in association with the first type of mining installation. Consequently, it should be appreciated that the description of FIGS. 3, 4, 5 and 6 in connection with said rope 7 could equally have applied to the guide rope 35. In the first type of installation relative movement occurs between stationary sensors and a moving rope whereas in the second type of installation relative movement occurs between moving sensors and a stationary guide rope. The sensors are the same sort in both installations and the rope is marked in a like manner in both installations.

Referring now to FIG. 8, a block electrical circuit diagram of a similar type to FIG. 2 is shown the like reference numerals are used as appropriate. The guide rope 35 is shown in two places for convenience, but it is to be understood that both views are of the same rope. In connection with the rope 35 on the left, the mine cage 4 is schematically indicated in a dotted box. The signals from the sensors 11 and 12 are transmitted up the shaft 1 along the rope by a transmitter 38. The transmitter 38 is powered by a battery 40 and transmission up the shaft takes place along the guide rope 35. To effect coupling and decoupling of the signal from the guide ropes, toroids 42 and 44 are utilised. These toroids are described in our co-pending British Patent Application No. 29861/78. A receiver 45 receives the signals from the sensors 11 and 12 via the decoupling toroid 44. The receiver transmits the electrical signals to the respective low pass filters 13 and 14 and thereafter the circuit of FIG. 8 is analogous to that of FIG. 2.

It is to be understood that the next following description relating to FIGS. 9, 10 and 11 shows apparatus which is serially connected in the manner shown in FIG. 2 or 8.

Turning now to FIG. 9, the sensors 11 and 12 are described in more detail, the upper part of the Figure corresponding to sensor 11 and the lower part to sensor 12. Considering first the sensor 11 shown in the upper part of FIG. 9 it will be seen that the sensor comprises a flux-gate magnetometer. Power is supplied to the magnetometer through positive and negative supply rails 48 and 49, respectively. A blocking oscillator 50 is formed by transistor 51, capacitor 52, resistor 53, and two inductors 54 and 55 respectively. A link 56 is also provided in the oscillator power supply. The inductor 55 is wound onto a circular ferromagnetic core (not shown) for the purpose of driving the core. The inductor 54 is a feedback winding for the oscillator 50. A capacitor 57 prevents the oscillator looking onto a high frequency oscillation mode when the core is put in a high magnetic field. A field effect transistor 58 limits and stabilizes current in the oscillator arrangement.

A low impedance voltage rail, approximately half way between the supply rails is formed by integrated circuit 60 and its associated circuit components, is resistors 61, 62, and 63 and capacitors 65 and 66.

A detection circuit for magnetic field parallel to the sensing core axis comprises inductors 68 and 69 wound onto the sensing core (being the same core as said ferromagnetic core) together with resistors 70, 71, 72 and 73, diodes 74 and 75, and capacitors 76 and 77. The diodes 74 and 75 conduct at each flyback spike of the blocking oscillator to sample the pickup voltages on the sensing coils 68 and 69. The output voltage appears across the capacitors 76 and 77.

An integrated circuit amplifier 80 and its asociated circuit components, ie resistors 82, 83, 84, 85 and capacitor 86 forms a simple amplifier stage of which the gain is set during calibration at a suitable desired value. The offset voltage of this stage can be adjusted by altering a variable resistor 81.

A second order filter and output amplifier are formed by integrated circuit 87 together with its associated circuit components, ie resistors 88, 89, 90 and 91 and capacitors 92 and 89.

In FIG. 9, the sensor 12 is constructed in a like manner to the sensor 11 and like reference numerals are used for like parts. Operation of the two sensors is also similar as is described below, however, slight variations in winding on the ferromagnetic cores can cause slight variation in operation. The two oscillators in the two sensors 11 and 12 are connected in series by an appropriate linking of the links 56. Connection of the oscillator in series reduces the circuit power consumption.

Turning to FIG. 10, the low pass filter 13 can be seen to comprise one of the type known in the art as a fourth order Buterworth filter. The low pass filter 14 which is not shown in FIG. 10 is constructed in a like manner to filter 14. The filter has the effect of attenuating high frequency signals and in the example, there is a 3 db cut off above 200 Hz. The filter comprises two second order filters cascaded together, the first filter being shown to the left and the second to the center of the FIG. 10. The first filter comprises an operational amplifier 93 and its associated circuit components, resistors 94, 95, 96 and 97 and capacitors 98 and 99. As is known in the art, variation of the values of the resistors 94 and 95 and capacitors 98 and 99 causes the cut off frequency of the filter to be changed. The second filter is constituted by operational amplifier 100 and its associated circuit components, ie resistors 101, 102, 103 and 104 and capacitors 105 and 106. Variation of resistor 100 and 101 and capacitors 105 and 106 cause variation in cut-off frequency. The essential features of the construction of the fourth order Buterworth filter have now been mentioned.

In FIG. 10, clamping diodes are shown at 107, 108, 109 and 110. The clamping diodes ensure that the filter amplifiers are not overloaded at any stage. A final operational amplifier 112 on the output of the filter, acts as an adjustable level comparator in association with resistors 114, 115, 116 and a variable resistor 117. A reference voltage for the operational amplifier is wiped off the variable resistor 117.

Turning now to FIG. 11, it can be seen that the Figure is divided by a dotted line into a left hand and a right hand portion. The left hand portion shows the delay units 15 and 16 of FIG. 2 or 8 and the right hand portion shows the sequential logic unit 20. The delay unit of FIG. 11 is now described with reference also to FIGS. 12 and 13. The delay unit comprises two integrated circuits NAND gates 120 and 121 being connected to each channel from the sensors 11 and 12 respectively. An RC delay unit is provided for each channel and is constituted by resistor 123 and capacitor 124 for the channel from sensor 11 and by resistors 125, 126 and capacitor 127 for the channel from sensor 12. The time constant of the RC network of channel 2 is longer than that of the RC network of FIG. 1.

After passage through the filter unit 13, the signal from the sensor 11 is fed to terminal 1 of NAND gate 120 via the RC network. Similarly, the signal from sensor 12 is fed to the NAND gate 121 via filter 14 and the respective RC network. A noise pulse is shown in FIG. 12 and such a noise pulse could be fed into both channels by electrical or magnetic interference to the circuitry or by mechanical vibration. The action of the RC networks and NAND gates as channels 1 and 2 is also shown in the Figure. FIG. 13 shows the action of the NAND gates and network in logic terms.

Turning to the right hand part of FIG. 11 the sequential logic unit 20 may be seen to comprise a plurality of NAND gates 180 to 195 and a plurality of signal inverters 200 to 205. An integrated monostable circuit is shown at 210 and the monostable cause periodic pulses to be derived for each logic direction counting output of the NAND gate and inverter circuitry. An opto isolator 211 is also shown in FIG. 11 and the isolator provides a pulse output in response to flashing of a light emitting diode 213 in the isolator, which diode flashes every time there is a common high pulse received from the sensors 11 and 12 by the delay units 15 and 16. The flashes cause pulses across the emitter/collector of a transistor 212 in the opto isolator. The transistor 212 is connected to a frequency detector 214.

Turning now to FIG. 14, the first error detection circuit is shown in more detail. The unit 17 comprises two eight bit registers 140 and 141. Inputs from the delay units 15 and 16 are indicated at x and y respectively. The shift registers 140 output to a warning device 143 and the warning device is triggered if either register fails in operation as described below. The shift registers are also tapped when only partially full and the tapping points are shown at a and b for the registers 140 and 141 respectively. Use of the signals tapped at a and b is explained in operation below and also with respect to FIG. 15.

Referring to FIG. 15, the second error detection circuit 18 is shown in more detail and can be seen to comprise a monostable circuit 150, a capacitor 151 for determining the duration of pulses derived by the monostable circuit 150, OR gates 154 and 155, a capacitor 156, an AND gate and the warning device 143. Inputs x and y are again shown and denote the same inputs as in FIG. 14. The tapping points a and b of FIG. 14 are also shown as the inputs to the OR gate 155.

Turning to FIG. 16, the third error detection unit 19 is shown in more detail and the sequential logic unit of FIGS. 2 and 8 is again shown at 20. The third error detection circuit comprises an OR gate 160 and two AND gates 162 and 163, respectively. Inputs x and y and the warning device 143 refer to the corresponding parts in FIGS. 14 and 15.

Referring to FIG. 17, an alternative or additional form of the third error detection circuit is shown. The error detection circuit of FIG. 17 comprises two NOR gates 170 and 171, two AND gates 173 and 174, four capacitors 175, 176, 177 and 178, an OR gate 179 and the warning device 143 previously mentioned in connection with FIGS. 14, 15 and 16.

Operation of the invention is first described in general terms with reference to FIGS. 1, 2, 3, 4, 5 and 6 in the first type of installation and with reference to FIGS. 7, 8, 3, 4, 5 and 6 in the second type of installation. Operation is described in more detail subsequently with reference to FIGS. 9, 10, 11, 12 and 13.

Turning to FIG. 1, it will be appreciated that as the mine cage 4 moves up and mine cage 5 moves down, relative movement occurs as between the sensors 11, 12 and the magnetically marked rope 7. As the relative movement occurs the sensors 11 and 12 will derive the output signals shown at 27 and 28 in FIG. 4, respectively. The signals are derived in response to the magnetic field adjacent to the rope and indicated thereby. The signals of FIG. 4 are squared by the circuitry into the form shown in FIG. 5 and corresponding to the series of logic values in FIG. 6. Consequently it can be appreciated that as the rope moves with respect to the sensors a sequence of pairs of logic numbers is produced. Any given pair of numbers results from a given position of the rope 7 with respect to the sensors during a cycle of the sequence of pairs of logic numbers.

The electrical signals from the sensors are fed to the filters 13 and 14 respectively and the high frequency oscillator driving signal from the sensors (which are flux-gate magnetometers) is filtered out.

The filtered signals are then fed through the delay units 15 and 16 for the purpose of removing noise as has been mentioned and as will be described in more detail below. The sequential logic unit 20 then receives the signal from the sensors and derives further pulse signals therefrom, which pulse signals indicate the direction of travel and position of the mine cages. Although this operation is described in more detail below with reference to FIG. 11, a brief description is helpful in respect of FIGS. 1 and 2. It will be appreciated that the pulse signals are produced in a repetitive sequence indicative of the direction of movement of sensors with respect to the rope, because while going in any one direction a pair of logic values in FIG. 6 is not immediately repeated by the next following pair. Consequently, it is possible for the unit 20 to count in the one direction. When, however, the rope 7 moves in an opposite direction with respect to the sensors, then a pair of logic values repeats itself, so that the unit 20 records a change in direction and counts in the opposite sense.

The unit 20 feeds the further pulses to the interface unit 21. The interface unit 21 displays the position of the mine cage in the mine shaft and can provide a signal for operating computer means (not shown) or other further signal processing means (not shown).

The error detection circuits 17, 18 and 19 are provided to remove errors which can arise in operation because of faulty circuit function. Such faulty functioning tends to cause single channel failure as opposed to the common channel noise interference referred to above.

The first error detection circuit 17 functions to remove errors caused by failure of one channel owing to for example, damage being caused to one of the sensors 11 or 12. The circuit 17 is thus connected across the two channels and effectively compares their output. This is described further below in FIG. 14.

The second error detection 18 compares the output frequency of the pulses from the sensors 11 and 12 and in this way perform a similar function to the first circuit 17, but in a different manner. This operation is described in more detail below with reference to FIG. 15.

The third circuit 19 compares the input to the unit 20 with the output therefrom and detects error in the operation thereof as is described below in FIGS. 16 and 17.

Considering now operation of the second type of installation shown in FIG. 8, this is similar to that of the first type except that, as has been mentioned, the magnetically marked rope is stationary and the sensors 11 and 12 move. In this case, however, the sensors detect a similar repetitive variation of the magnetic field around the guide rope and similar logic pairs of numbers are derived. Coupling of the sensor signals to the filters 14 and 15 is effected by means of the the coupling toroid as has been previously mentioned.

Operation of the circuitry is now described with reference to the more detailed FIGS. 9, 10, 11, 12, 13, 14, 15, 16 and 17 beginning with FIG. 9.

Considering the upper sensor 11, the oscillator 50 drives the ferromagnetic sensing core (not shown) periodically into saturation by means of a periodic current in the drive windings 54 and 55. The sensing windings 68 and 69 on the ferromagnetic core are wound on diametrically opposed sections so that the driving signal from the oscillator 50 is cancelled out in the windings.

Following the saturation of the core, induction returns to its equilibrium point and a large flyback voltage spike appears on all windings on the sensing core. The diodes 74 and 75 conduct at each flyback spike of the core to sample the detected voltages in the pickup windings 68 and 69.

The gain of the first amplifier stage including integrated circuit amplifier 80 is chosen by selection of values for the resistors 84 and 85. The capacitor 86 affords some high frequency roll-off or attenuation. The variable resistor 81 is adjusted so that the output voltage from the first amplifier stage falls half way between the supply voltages for a zero sensed field. Offset voltages caused by the detector circuit, amplifier and the integrated circuit are thus removed.

However, when the sensing coils 68 and 69 are in the vicinity of the magnetized rope, then the voltage fed to the integrated circuit 80 will vary as the magnitude and direction of the magnetic field induced adjacent to the rope. As has been mentioned the output from the amplifier stage is then fed to a second order active filter to filter the high frequency harmonics of the driving signal. The sensors 11 and 12 operate in analogous manner and thus derive the output signals shown in FIG. 4 in response to the variation magnetic field strength adjacent to the magnetised rope.

Referring to FIG. 10, operation of the fourth order Butterworth function can be seen from the Figure. The input from the sensor 11 is fed through resistors 94 and 95 to the operational amplifier 93. The input voltage is clamped to a reference voltage by the diodes 107, 108, 109 and 110. The filter operates to attenuate input frequencies above 200 Hz and the filtered signal appears at the output of the operational amplifier 112. Both of the filters 13 and 14 operate as the filter 13 which is shown in FIG. 10.

Referring now to FIG. 11 operation of the delay units 15 and 16 is described. The filtered signals from filters 13 and 14 are fed to terminal 1 of NAND gate 120 and terminals 4 and 5 of NAND gate 121 respectively from the respective filters 13 or 14. Reference should now be made to FIGS. 12 and 13 in addition to FIG. 11. The purpose of the delay units 15 and 16 is to remove interference common to both channels, since it is necessary that the sequence of logic pairs referred to above in connection with FIGS. 5 and 6 should not be distorted. Consequently, a common interference should have no effect other than causing a sequence in the logic pair which would correspond to no overall movement if the sequence had been received from the sensors 11 and 12. In FIG. 13, a sequence of logic pairs is set out which satifies the constraints outlined above, as the first and second pairs in the sequence correspond to the fifth and fourth pairs respectively. In FIG. 12, a noise pulse is shown at the top of the Figure, the effect of the noise pulse on the signal from sensor 11 on the centre of the Figure, and the effect of the noise pulse on the signal from sensor 12 at the bottom of the Figure. From FIG. 12 it will be appreciated that noise pulse has generated a sequence of logic levels corresponding to FIG. 13. Thus the noise pulse does not accumulate an error count. Turning back to FIG. 11, the mechanics of circuit operation are now explained.

The RC network comprising resistor 123 and capacitor 124 in the channel from sensor 11 has a first time constant and the signal from the filter 13 is fed therethrough to the NAND gate 120. Terminal 2 of NAND gate 120 is connected permanently high. The RC network comprising resistor 126 and capacitor 127 in the channel from sensor 12 has a second and longer time constant and the signal from filter 14 is fed therethrough to input 5 of integrated circuit 121. The signal from filter 14 is also fed to terminal 4 of NAND gate 121 via the resistor 125.

Thus as noise input signal (a logic 1) to input 1 of NAND gate 120 will cause the output of that gate to switch low (a logic 0) after the first time constant. The period that the output is low (0) will be the same as for the noise signal ie the effect of the delay unit is merely to cause a delay equivalent to the first time constant. However, for the output of NAND gate 121 to go from high to low (logic 1 to 0), both inputs 4 and 5 must be high (1). However, input 5 has a delay thereon so that the NAND gate 121 will not switch until after the delay which is equal to the second time constant. Consequently, the output of the gate 121 will switch low (0) after the output of gate 120. When the output is low (0), then if only one of the inputs switches high to low (1 to 0), the output of the gate 121 switches high (0 to 1). As there is no delay on terminal 4, the gate 121 will follow the noise directly.

In view of the foregoing it can be seen that the noise signal has the effect on the circuitry which is shown in FIG. 12.

Turning now to the right hand portion of FIG. 11, operation of the sequential logic unit is described. Reference is also made to FIG. 6. The sequential logic circuit is designed to count up whenever a logic pair in FIG. 6 changes from 10 to 11 and to count down whenever a pair changes from 11 to 10. Thus a count up or count down occurs over pitch length of the marking along the magnetised rope.

The circuit for deriving the counts up or counts down is powered from supply rails 206 and 208. Count up pulse appear on pin 12 of NAND gate 193 and count down pulses appear on pin 3 of NAND gate 194. The inputs from the delay units are from pin 3 of NAND gate 120 and pin 6 of NAND gate 121 to the sequential logic unit. The sequential logic unit has a memory and consequently, the output are functions not only of present inputs, but also of past circuit state.

The inputs from the delay units are called primaries in the art and memory components are called secondaries in the art. Secondaries have a time delay before they become excited, ie respond to input signals. Hence secondaries have two states, their present state or their next following state or excitation. In FIG. 11, the secondaries are the output terminals of the NAND gates 183 and 187 being terminals 8 and 6 respectively. The excitations are represented at the feeding back of the outputs to the preceding circuitry, in the case of NAND gate 183 to NAND gates 181, 182, 184, inverter 201 and thence to NAND gate 185 and in the case of NAND gate 187 to NAND gate 181, 182, 184, 185, inverter 200 and thence to NAND gate 180.

The excitations and the counting up and counting down inputs can be expressed in Boolean algebra terms for the purposes of circuit design, but in FIG. 11, the result of the circuitry is to derive count up or count down pulses in response to the rope mark as has been explained.

However, for the purposes of explaining the invention more clearly to a person skilled in the art, the logic values of the signals at certain points in the circuit can be expressed as follows:

NAND gate 193 pin $12 = \bar{x}_1 x_2 \bar{y}_1 y_2 + x_1 \bar{x}_2 y_1 \bar{y}_2$
NAND gate 194 pin $3 = x_1 \bar{x}_2 \bar{y}_1 y_2 + \bar{x}_1 x_2 y_1 \bar{y}_2$
NAND gate 183 pin $8 = y_1 y_2 + y_1 x_1 + y_2 x_1 x_2$
NAND gate 187 pin $6 = x_1 x_2 + \bar{y}_1 \bar{y}_2 x_2 + y_1 y_2 x_1$ where
  $x_1$ = the logic value of the input from the filter 13
  $x_2$ = the logic value of the input from the filter 14
  $y_1$ = the secondary arising from NAND gate 183 pin 8
  $y_2$ = the secondary arising from NAND gate 187 pin 6

In the above equations:
  the symbol − implies use of the NOT operation,
  the symbol + implies use of the OR operation, and characters written together implies the AND operation eg $x_1 x_2$ implies $x_1$ AND $x_2$.

The opto-isolator 211 has an output signal across the emulsifier/collector of transistor 212. The frequency of pulses from the transistor 212 is counted by the frequency detector 214. It will be appreciated that the detected frequency of pulse is proportional to the speed of the mine cage and thus an indication of velocity is provided. The counter number of direct speed reading can be displayed on the interface means 21 through an appropriate sealing factor.

From the above description it will be appreciated that a count up pulse is derived as the cage moves upwards and a count down pulse as the cage moves downwards.

The output counting pulses from pin 12 of the NAND gate 193 and the pin 3 of the NAND gate 194 are not necessarily of the right duration for operating the interface 21. Consequently the counting pulses are fed to a monostable integrated circuit 210 so that they are all of the same duration and are therefore suitable for actuating the interface means. The output pulses produced by the monostable circuit are produced on pins 4 and 12 of the integrated circuit 210, pin 4 being count up and pin 12 count down. Unreferenced decoupling capacitors are shown on other outputs of the monostable integrated circuit 210.

The opto-isolator 211 produces signal pulses as has been explained previously and the rate of production of these pulses is proportional to the speed of the mine cage.

Operation of the first error detection circuit 11 is now described with reference to FIG. 14. In normal operation, pulses are received alternately from the two sensors 11, 12 ie alternately at x and y. A pulse at x has two effects, being to advance the shift register 140 one stage and to ground the shift register 141 thereby removing any count therein. A pulse at y also has two effects, being to advance the shift register 141 one stage and to ground the shift register 140, thereby removing any count therein.

In normal operation of the circuit 17, therefore, the shift register 140 counts up one, is grounded, counts up one, is grounded and so on. Similarly, the shift register 141 counts up one, as grounded and so on. This occurs because of the alternate receipt of pulse at x and y.

However, should a fault condition arise, such as for example one channel going dead, for example because the sensor 11 stops functioning, then a plurality of pulse will be received on input y whereas none will be received at input x. As soon as eight pulses are received, the shift register 141 will fill and immediately it fills, the warning device 143 is actuated. Similarly if input y were to go dead, then register 140 would fill and the warning device 143 would likewise be actuated.

The shift registers are allowed eight pulses before the warning device is actuated to allow for vibrational movements for example stopping of the cage at which time the sensor may pass the same point in the rope a few times so that two or three counts are received on one channel. Of course, as soon as a pulse is received on the other channel the shift register is grounded and the two or three counts are removed. The tapping points a and b are utilised in connection with the second error detection circuit which is now described with reference to FIG. 15.

In FIG. 15, a pulse from either x or y will trigger the monostable circuit 150 owing to the OR gate 154. The duration of the monostable output pulse is adjusted by variation of the capacitor 151. The monostable output pulse duration is fixed in the example at about 250 microseconds. A pulse length from the sensors to x or y corresponds to a cage speed of about one and a half meters per second if the pitch of the magnetic marking is forty centimeters.

A pulse from either of the tapping points a or b will give a high output from the OR gate 155. Such a high output will arise if either of the shift registers exceed a content of 2 counts.

The outputs from the OR gates 154 and 155 and the output from the monostable 150 are connected to the AND gate 158. Consequently, at a velocity greater than one and a half meters per second, the monostable output pulse length will be greater than the pulse length of either x or y so that a pulse from a or b can cause the AND gate 158 to have a high input to actuate the warning device 143.

However, if the cage velocity is below one and a half meters per second, the pulse from the monostable circuit 150 is shorter than that from the OR gate 154, so that the AND gate 158 does not have a high output as the trailing edge of the pulse from OR gate 154 does not occur soon enough to permit a high output from the AND gate 158 and actuate the warning device 143.

Thus the circuit of FIG. 15 causes actuation of the warning device if pulses from the sensors 11 and 12 arrive out of order when the cage is travelling at speed greater than one and a half meters per second.

Operation of the third error detection circuit is now described with reference to FIGS. 16 and 17. In FIG. 16, the x and y inputs are to the sequential logic unit 20 are tapped and fed to the AND gate 162. The outputs from the unit 20 are tapped and fed to the OR gate 160. The outputs of the gates 160 and 162 are fed to the AND gate 163, the output of which is operable connected to the warning device 143.

The AND gate 162 has a high logic output (1) at the high logic (1) states of the input signals at x and y. The AND gate 162 therefore has a narrow high output whenever the logic unit 20 should count up or down. Similarly, the OR gate 160 has a high (1) output caused by either of the outputs from the unit 20 being at their high logic state (1) as the unit 20 actually counts up or down. There is however a delay in the unit 20 so that the outputs from gate 160 and 162 are not high (1) at the same time. Either high output signal from the gate 160 or 162 will therefore be blocked from actuating the warning device 143 by the AND gate 163. However, should a pulse appear at the output of gate 160 at the same time as from the gate 162 through faulty functioning of unit 20, then the gate 163 would have a high output to actuate the warning device 143.

The inputs to the AND gate 163 are tapped for use in the alternate or additional form of the third error detecting circuit shown in FIG. 17. The error detection circuit is a flip-flop gated comparator and consequently for every high logic point (1) on both of the channels from sensor 11 and 12, ie x and y, a pulse from point d will set the NOR gate 171 and pass to the AND gate 174 and depending on the logic state of the NOR gate 171 will or will not be passed through to actuate the warning device 143. A similar situation exists in respect of operation of the input from point c to the NOR gate 170 and AND gate 173.

In normal operation of the unit 20, the pulse from either c or d will arrive at the respective AND gate (173 or 174) with the corresponding low logic (0) on the other input. Following the pulse at the set NOR gate 170 or 171, a pulse from the other input d or c a pulse will reset the NOR gate 171 or 170. Consequently, in normal operation, there will not be a high input at both terminals of either of the AND gates 173 or 174.

However, if the pulses from c and d come in any other order then one or both of the AND gates 173 or 174 will have a high input (1) on both terminals and will derive an output signal to activate the warning device 143.

It will be appreciated that although the circuitry in the Figures is shown as discrete components, in practice it will often be more convenient to fabricate the circuit as one or more integrated circuits or use a microprocessor or minicomputer to function as described above.

From the above description it can be seen that the present invention provides equipment for monitoring movement of a member along an elongate path along which a magnetizable component is extensible, whereas errors are detected whether caused by external interference or by faulty circuit operation.

I claim:

1. Equipment for monitoring movement of a member along an elongate path along which a magnetizable component is extensible, the magnetizable component being magnetized such that a magnetic field is induced adjacent thereto, the induced magnetic field intensity varying longitudinally of the magnetizable component and along said elongate path insofar as the magnetizable component is extended therealong, said induced magnetic field defining a wave like pattern of constant pitch, the equipment including a magnetic detector component comprising two magnetic sensors arrangeable adjacent to the magnetizable component and spaced from one another by an amount differing from said pitch or from one quarter of said pitch or from multiples of one quarter of said pitch, one of the components being movable with respect to the other component as the member moves, the two magnetic sensors deriving a first electrical signal and a second electrical signal respective electrical signals in response to the magnetic field sensed adjacent to the magnetizable component, said electrical signals varying as said wave like pattern and being out of phase by an amount dependent upon said amount of spacing of the sensors, error detecting means for differentiating error components from information components in the derived electrical signals and sequential analysis means for deriving a further signal indicative of the magnitude and direction of movement of the member from the derived electrical signals.

2. Equipment as claimed in claim 1, wherein the error detecting means comprises a first time delay unit connected between the first sensor and the sequential analysis means and a second time delay unit connected between the second sensor and the sequential analysis means, the first time delay unit and the second time delay unit having differing time constants so that error components common to the first electrical signal and the second electrical signal have a differing effect on the two signals to detect the common error component.

3. Equipment as claimed in claim 2, wherein the first and second time delay units include RC networks.

4. Equipment as claimed in claim 1, wherein the error detecting means comprises a first shift register connected between the first sensor and the sequential analysis means to count up in response to the first electrical signal and a second shift register connected between the second sensor and the sequential analysis means to count up in response to the second electrical signal, the first shift register being grounded by the second electrical signal and the second shift register being grounded by the first electrical signal, the shift registers having a warning output when full.

5. Equipment as claimed in claim 4, wherein the error detecting means further comprises a first gate having inputs connected to receive the first signal and the second signal, a second gate having inputs connected to the first shift register and to the second shift register, a circuit arranged to derive a third electrical signal of a desired value and a third gate arranged to receive the output signals from the first gate, second gate and circuit and to derive a warning output if the first signal and the second signal should occur out of a desired sequence at a rate determined by the value of the third electrical signal.

6. Equipment as claimed in claim 1, wherein the error detecting means comprises a fourth gate connected to the inputs to the sequential analysis a fourth gate connected to the inputs to the sequential analysis means and having an output dependent upon the inputs, a fifth gate connected to the outputs of the sequential analysis means and having an output dependent upon the outputs and a sixth gate connected to the outputs of the fourth gate and the fifth gate, the sixth gate having a warning output if the outputs from the fourth and fifth gate vary other than in a desired manner.

7. Equipment as claimed in claim 6, wherein the error detecting means further comprises a seventh gate and an eighth gate connected to the outputs of the fourth gate and fifth gate respectively and arranged as a flip-flop means in relation to said fourth and fifth gates, a further gate arrangement being connected to the output of the flip-flop means, said flip-flop means being arranged to cause a warning output from the further gate arrangement if the fourth and fifth gates have outputs which vary other than in the desired manner.

8. Equipment as claimed in claim 2, wherein a first low pass filter is connected between the first sensor and the first time delay unit and a second low pass filter is connected between the second sensor and the second time delay unit, the first and second low pass filters removing high frequency noise from the first and second electrical signals respectively.

9. Equipment as claimed in claim 8, wherein the first and second sensors comprise flux gate magnetometers.

10. Equipment as claimed in claim 1, wherein the sequential analysis means comprises a plurality of logic gates and a monostable circuit.

11. Equipment as claimed in claim 10, wherein the output from the sequential analysis means is connected to an interface means.

12. Equipment as claimed in claim 11, wherein the interface means can display the value of said output from the sequential analysis means.

13. Equipment as claimed in claim 10, wherein the sequential analysis means includes an opto-isolator connected to the logic gates such as to have an output of frequency dependent upon the rate at which the sensors move with respect to the magnetizable component.

* * * * *